Aug. 12, 1958 A. G. EVANS 2,847,514

AUTOMATIC VARIABLE PITCH CONTROL APPARATUS FOR DISC RECORDERS

Filed Sept. 23, 1955 2 Sheets-Sheet 1

INVENTOR.
Arthur G. Evans
BY Morris Rabkin
ATTORNEY.

Aug. 12, 1958 A. G. EVANS 2,847,514

AUTOMATIC VARIABLE PITCH CONTROL APPARATUS FOR DISC RECORDERS

Filed Sept. 23, 1955 2 Sheets-Sheet 2

INVENTOR.

Arthur G. Evans

BY Morris A. Rabkin

ATTORNEY.

United States Patent Office
2,847,514
Patented Aug. 12, 1958

2,847,514

AUTOMATIC VARIABLE PITCH CONTROL APPARATUS FOR DISC RECORDERS

Arthur G. Evans, Indianapolis, Ind., assignor to Radio Corporation of America, a corporation of Delaware Application September 23, 1955, Serial No. 536,240
9 Claims. (Cl. 179—100.4)

This invention relates to control apparatus for disc recorders, and more particularly to apparatus for controlling the pitch of the sound track grooves in a record disc during the recording process. The control apparatus of the present invention is particularly useful in the production of variable pitch recordings on phonograph records. By means of the present invention, it is possible to increase the playing time of a phonograph record with a greater safety factor in regard to overcutting of the sound track grooves.

The term "pitch," of a record disc, as used herein, refers to the number of sound track grooves per inch recorded on the record. Thus, a variable pitch record is one that contains a different number of sound track grooves per unit of length on different parts of the record. The pitch of a particular portion of a record disc will usually vary inversely with the amplitude of the signals recorded.

Apparatus for producing variable pitch records provides means for continuously and automatically changing the pitch of the sound grooves in the phonograph record in accordance with the amplitude of the signal being recorded. It has been proposed to make disc records of variable pitch by controlling movement of the recording head used to cut the sound track grooves. Where the recording head is advanced on a lead screw, it has been found that the inertia of the machine controlling the advance of a recording head is too great for the recording head to follow the amplitude of the signals directly. In machines where the recording head is made to follow the envelope of the signals to be recorded, it has been found that the recording head will not decelerate quickly enough from a high speed to a low speed upon the cessation of a high amplitude signal. Accordingly, it has been proposed to provide such machines with mechanical arrangements whereby the recording head is fixed to a carriage that is advanced by a lead screw, and the recording head is made slidable with respect to the carriage when sudden acceleration or deceleration of the recording head is desired.

It has been found, in practice, that it is desirable to have a fixed minimum and a fixed maximum pitch in recording a variable pitch record, in response to signals of predetermined high and low ampliude, respectively, rather than to have the pitch of the record vary continuously with the amplitudes of the signals at all times. It has also been found desirable to have the pitch of the record vary with the envelope of the signals to be recorded, rather than to have the pitch vary directly with each change in amplitude. When the pitch of the record varies with the envelope of the signals, however, a resistance-capacitance network with a fixed relatively long decay time is used, and it takes a relatively long time for the movement of the recording head to decelerate quickly enough upon the cessation of a signal of high amplitude.

Accordingly, it is an object of the present invention to provide an improved automatic variable pitch control apparatus for disc recorders that will overcome one or more of the aforementioned disadvantages.

Another object of the present invention is to provide improved automatic variable pitch control apparatus for disc recorders that will provide a fixed minimum pitch of recording in response to signals greater than a first predetermined amplitude, and a fixed maximum pitch of recording in response to signals smaller than a second predetermined amplitude.

Still another object of the present invention is to provide automatic variable pitch control apparatus for disc recorders that will cut sound track grooves in a disc record with a pitch proportional to the envelope of the amplitude of signals between predetermined upper and lower limits of amplitude, and which will move the recording head quickly to a position for maximum pitch recording in response to a threshold signal of an amplitude intermediate the aforementioned upper and lower ampliude limits.

A further object of the present invention is to provide improved automatic variable pitch control apparatus for disc recorders employing a resistance-capacitance network having a relatively long time constant for obtaining a signal representing the envelope of signals to be recorded, and means responsive to a signal of predetermined amplitude for accelerating the decay time of the resistance-capacitance network when the recorded signals suddenly change in amplitude from high amplitude signals to low amplitude signals.

Still a further object of the present invention is to provide an automatic variable pitch control apparatus for disc recorders that is relatively simple in construction and operation, easy to manufacture, and yet highly efficient in use.

In accordance with the present invention, the foregoing and other related objects and advantages are attained in improved control apparatus for disc recorders of the type wherein a recording head is fed over a record by a lead screw. A magnetic tape or wire is used as a source of material to be recorded and is reproduced by two play-back heads. One of these play-back heads, used in a control circuit channel, precedes the other playback head, used in a recording channel, and is spaced so that there is about a one second time delay between them. A voltage derived from the signal to be recorded is used as the input to a pitch control circuit, which in turn controls the advance of the lead screw through a servo system. Means are provided to fix the maximum and minimum pitches of the sound track grooves to be recorded in accordance with signals of predetermined low and high amplitudes, respectively. The input signal to the control circuit is an audio voltage that is proportional to the amplitude of the signals to be recorded on the disc. This audio signal is rectified and developed across a long time constant resistance-capacitance network, a load on the rectifier, so that the pitch will tend to follow the envelope of the peaks of the recorded signals. A voltage limiter and an adjustable voltage divider circuit provide the means for setting the minimum pitch that will be available with high amplitude signals. A non-additive biasing circuit is connected to the voltage dividing circuit, through a diode, to fix the control voltage with very low amplitude signals. By adjusting this biasing circuit, the maximum pitch desired on any record disc may be fixed. A threshold control circuit is provided to reduce the time constant of the aforementioned load on the rectifier to a very low value on sudden and sustained reductions in level of the signals below a predetermined amplitude. The threshold control circuit monitors the signal level, and if the signal level goes below a predetermined point, and stays there for a predetermined time, usually two seconds, it automatically shorts the minimum pitch control. When this happens, the advance of the lead screw is decelerated quickly, so that the recording head will cut sound track grooves of maximum pitch. Thus, the pitch of the record disc is varied in accordance with the amplitude of the signals being recorded between maximum and minimum limits, and a maximum utilization of space is obtained on the disc for recording purposes.

The novel features of the present invention, as well as the invention itself, both as to its organization and method of operation, will be understood in detail from the following description when considered in connection with the accompanying drawings in which similar reference characters represent similar parts and in which.

Figure 1:
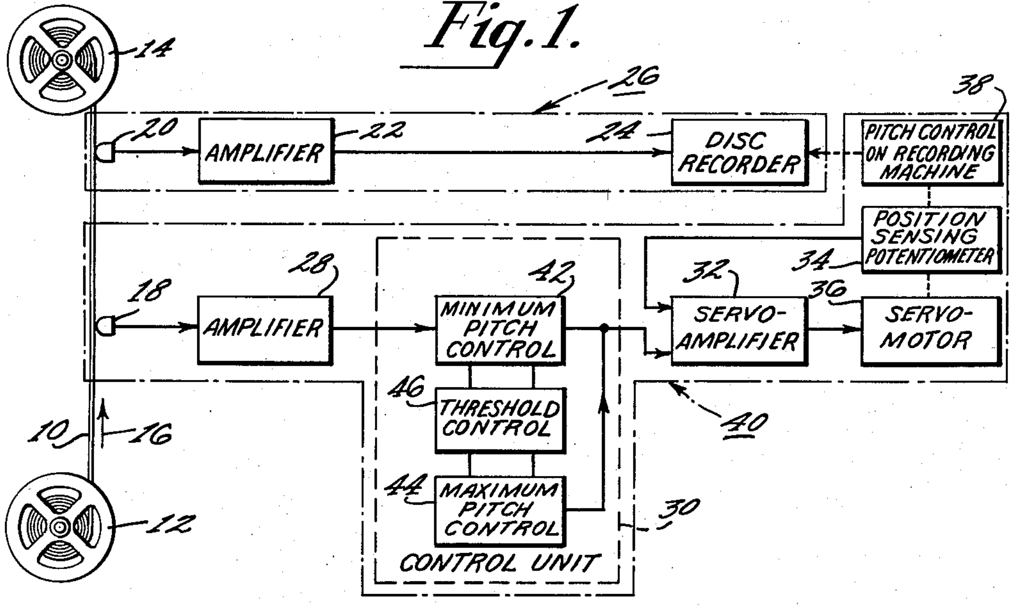
Fig. 1 is a block diagram of a recording system employing automatic variable pitch control apparatus, in accordance with the present invention.

Referring now particularly to Fig. 1, there is shown a recording system, wherein a magnetic tape 10 is used as a source of sound signals to be recorded on a record disc. During the recording process, the tape 10 is unwound from a reel 12 and wound up on a take-up reel 14, so that the tape 10 will move in the direction of the arrow 16. A control play-back head 18 is positioned ahead of a recording play-back head 20 for the purpose of obtaining control signals from the tape 10 at a predetermined amount of time in advance of the recording play-back head 20. Thus, the recording play-back head is usually positioned to receive the same signals picked up by the control play-back head 18 after about a one second delay. Signals from the recording play-back head 20 are applied to an amplifier 22, and are, also, applied to the cutting head (not shown) of a disc recorder 24. The recording play-back head 20, the amplifier 22, and the disc recorder 24 comprise a recording channel 26.

Signals from the control play-back head 18 are used to vary the pitch of the record disc during recording. Signals from the control play-back head 18 are amplified by an amplifier 28 and applied to a control unit 30. Signals from the control unit 30 are then applied to a servo amplifier 32 where they are compared with signals from a position-sensing potentiometer 34 for the purpose of controlling a servomotor 36. The servomotor 36 is mechanically connected to a pitch control mechanism 38 on the disc recorder 24. The recording head 18, the amplifier 28, the control unit 30, the servo amplifier 32, the position-sensing potentiometer 34, the servo motor 36 and the pitch control 38 on the recording machine comprise a control channel 40.

The control unit 30 comprises, a minimum pitch control circuit 42, and a maximum pitch control 44 for the purpose of fixing the minimum and maximum pitch of the disc being recorded. A threshold control circuit 46, connected between the minimum pitch control circuit 42 and the maximum pitch control circuit 44, is employed to reduce the pitch of recording to a maximum quickly when the signal level goes below a point set by the threshold control circuit 46 and stays there for a predetermined length of time, say two seconds.

Figure 2:
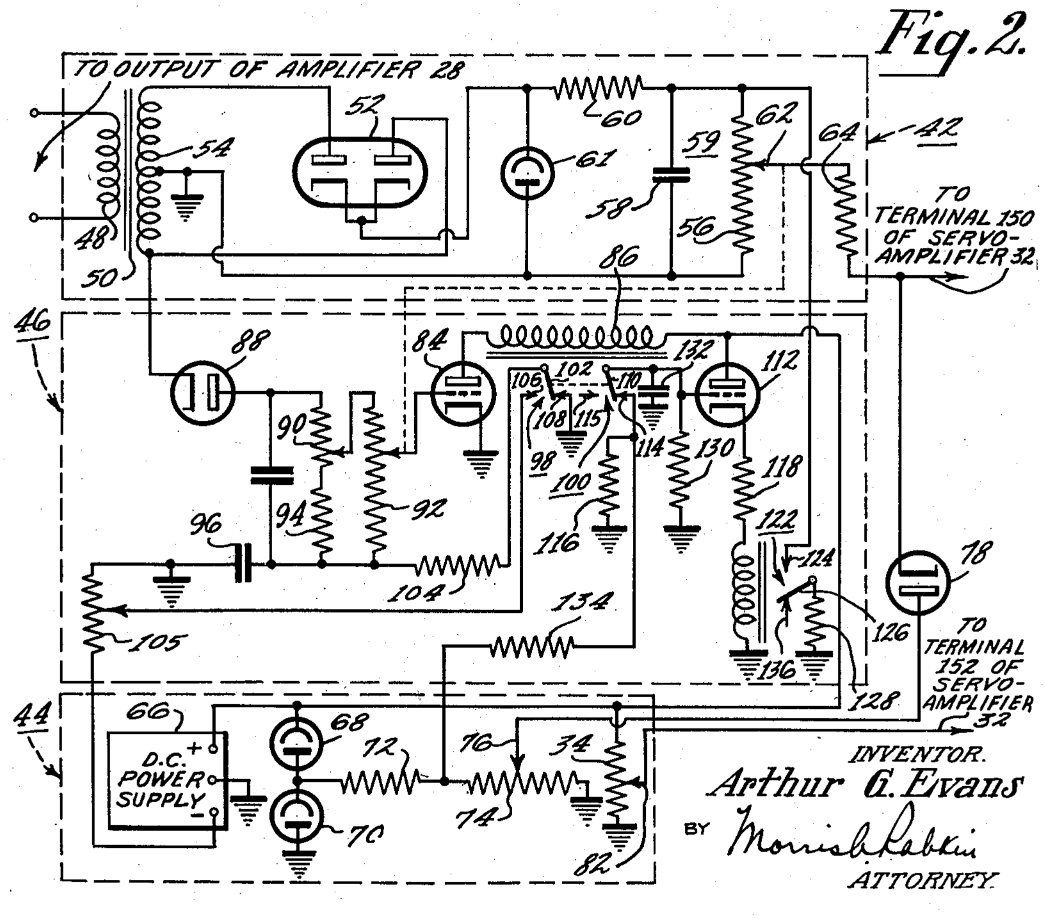
Fig. 2 is a more detailed schematic diagram of the automatic variable pitch control apparatus, in accordance with the present invention.

Referring now to Fig. 2, the control unit 30 will be described in detail, in accordance with the present invention. The output from the amplifier 28 (Fig. 1) in the control channel 40, is applied to the input of the minimum pitch control circuit 42 through the primary 48 of a transformer 50. A double diode 52 is connected in the circuit with the secondary winding 54 of the transformer 50 for full-wave rectification of the audio voltages from the amplifier 28. A potentiometer 56 and a capacitor 58, connected in parallel with each other, are each connected in series with the cathodes of the double diode 52, through a resistor 60, and a center tap of the secondary winding 54 of the transformer 50. The potentiometer 56 and the capacitor 58 comprise a resistance-capacitance network 59 having a relatively long time constant, say 30 seconds, and acts as a load on the double diode rectifier 52.

A voltage regulating device 61, such as a voltage regulator tube of the VR 105 type, is connected between the cathodes of the double diode 52 and the center tap of the secondary winding 54 of the transformer 50. The center tap of the secondary winding 54 is connected to a source of reference potential, such as ground. It will now be understood that audio signals from the output of the amplifier 28 are rectified by the full-wave rectifier 52 to provide control voltages, or signals, across the potentiometer 56.

Suitable proportions of the voltage signals developed across the potentiometer 56 are tapped off, by the movable tap 62 of the potentiometer 56, for application to the servo amplifier 32, through a resistor 64. The voltage regulating device 61 and the potentiometer 56 comprise means for fixing the minimum pitch of recording with high amplitude signals by limiting the maximum control voltage. Thus, the voltage regulator 61 will limit the voltage available at the tap 62 of the potentiometer 56 for rectified signals greater than a predetermined amount. Signals smaller than those that will be regulated by the voltage regulator 61 appear as variable voltages at the tap 62 of the potentiometer 56, and are used to vary the pitch of recording in accordance therewith.

Means are provided to fix the maximum pitch of the recording on the disc. To this end, the maximum pitch control circuit 44 (Fig. 2) comprises a unidirectional power supply 66 having an output terminal connected to ground. A pair of voltage limiting tubes 68 and 70, connected in series with each other, are connected between a positive terminal of the power supply 66 and ground, for voltage regulating purposes. The junction between the voltage limiting tubes 68 and 70 is connected to ground through a resistor 72 and a potentiometer 74, connected in series therewith. Thus, it will be understood that a tap 76 on the potentiometer 74 represents a fixed regulated voltage with respect to the reference potential ground. The potentiometer 74 is used to set the maximum pitch of recording by connecting its tap 76 to the tap 62 of the potentiometer 56, through a diode 78 and the resistor 64. The tap 76 of the potentiometer 74 is connected to the anode of the diode 78 so that the fixed voltage represented by the tap 76 will determine the voltage applied to the servo amplifier 32, even in the absence of any signals from the potentiometer 56. The latter case arises when the audio signals picked up are below a predetermined amplitude. A position-sensing potentiometer 34 is connected across the voltage limiting tubes 68 and 70. A movable tap 82 on the potentiometer 34 is connected to the servo amplifier 32, for the purpose hereinafter appearing.

The resistance-capacitance network 59, comprising the potentiometer 56 and the capacitor 58, has a relatively long time constant so that the control signals at the tap 62 of the potentiometer 56 will follow the envelope of the audio signals rectified by the double diode 52. Consequently, the voltage at the tap 62 of the potentiometer 56 will not decay rapidly enough upon a sudden and sustained reduction in the amplitude of the signals. Accordingly, there is provided, in accordance with the present invention, the threshold circuit 46 to reduce affectively the time constant of the resistance-capacitance network 59 to a very short time, when the signal to be recorded falls to a signal level of a predetermined threshold amplitude and remains there or below for at least two seconds. In other words, the threshold control circuit 46 monitors the signal level to be recorded and automatically short circuits the potentiometer 56 when the signal level falls below a predetermined voltage, and stays there for about two seconds. To this end, the threshold control circuit 46 comprises an amplifier tube 84 having a cathode connected to ground, and an anode connected to the positive terminal of the power supply 66, through a relay solenoid coil 86. Signals from the amplifier 28 (Fig. 1) are applied to the grid of the tube 84, through a diode 88 and serially connected potentiometers 90 and 92. To this end, the cathode of the diode 88 is connected to one end of the secondary winding 54 of the transformer 50, and the anode is connected to one end of the resistance of the potentiometer 90. The other end of the potentiometer 90 is connected to ground through a resistor 94, a capacitor 96. It will now be understood that signals from the amplifier 28 are rectified by the diode 88 and applied as biasing voltages to the grid of the tube 84. The movable taps on the potentiometers 90 and 92 are adjusted so that the tube 84 receives a voltage, hereinafter called a threshold voltage, that will keep the tube 84 from conducting when the signal to be recorded is greater than a predetermined amplitude. Thus, it will be understood that when the signal to be recorded goes from a relatively high amplitude voltage to a voltage at or below the threshold voltage, the voltage at the grid of the tube 84 will go from negative to less negative and trigger on the tube 84. When this happens, relay switches 98 and 100 will be actuated by the current flowing through the solenoid coil 86, associated with the relay switches 98 and 100.

The relay switch 98 comprises a movable armature 102 connected to one end of the potentiometer 92, through a resistor 104. One fixed contact 106 of the switch 98 is connected to the movable tap on a potentiometer 105 connected between ground and a negative output terminal of the power supply 66. Another fixed contact 108 of the relay 98 is connected to ground. The movable armature 110 of the relay switch 100 is connected to the grid of a triode 112. One fixed contact 114 of the relay 100 is connected to ground through a resistor 116. A second switch contact 115 of the relay switch 100 is not connected to anything and merely acts as a stop for the armature 110, when in that position. The anode of the tube 112 is connected to the positive terminal of the power supply 66, and the cathode is connected to ground through a resistor 118 and a solenoid coil 120 of a relay switch 122. One fixed contact 124 of the relay switch 122 is connected to the high voltage end of the potentiometer 56. The armature 126 of the relay switch 122 is connected to ground through a resistor 128 of relatively low resistance. The grid of the tube 112 is connected to ground through a resistor 130. The resistor 130 is bypassed to ground by a capacitor 132. The junction between the resistors 72 and 74 in the maximum pitch control circuit 44 is connected to the fixed contact 114 of the relay switch 100 through a resistor 134.

The operation of the threshold control circuit 46 will now be described. Let it be assumed that signals of relatively high amplitude are being recorded on a record disc and that the signals applied to the grid of the tube 84 are sufficiently negative to keep the tube 84 cut off. Under these conditions the armatures 102 and 110 of the relay switches 98 and 100 are biased in contact with the fixed contacts 108 and 114, respectively. It will be understood, that under these conditions, the voltage on the grid of the tube 112 is positive with respect to ground and of a sufficient magnitude to maintain the tube 112 in a state of conduction. With the tube 112 conducting, the armature 126 of the relay 122 is maintained in contact with a contact 136, the latter contact being merely a stop. Under these conditions, the signals to be recorded will produce proportional signals at the tap 62 of the potentiometer 56. These latter signals will control the pitch of the record disc proportionally, in a manner to be described hereinafter.

Let it now be assumed that the signal to be recorded falls to a threshold voltage, or below, and stays there for at least two seconds. These conditions will cause the voltage at the grid of the tube 84 to go less negative and trigger on the tube 84. Current in the anode-cathode circuit of the tube 84 will actuate the relay switches 98 and 100 so that their respective armatures 102 and 110 will now touch the fixed contacts 106 and 115, respectively. The voltage that had been applied to the capacitor 132 will now start to discharge via the resistor 130, until the voltage on the grid of the tube 112 drops low enough to cut off conduction in the tube 112. When this happens, the armature 126 of the relay switch 122 will be biased against the fixed contact 124, thereby substantially shorting the potentiometer 56 to ground, via the low resistance resistor 128. Thus, the decay time of the resistance-capacitance network 59 is markedly accelerated. It will be noted that, in practice, it takes about two seconds for the voltage on the capacitor 132 to drop enough to cut off conduction in the tube 112. If the signals to be recorded go from a high amplitude to a low amplitude, pass the threshold voltage, but do not stay at or below the threshold voltage for more than two seconds, the relay switch 122 will not be actuated, from the position indicated in Fig. 2 in the diagram.

When the amplitude of the signals to be recorded has fallen below the threshold voltage and has remained there for a period of more than two seconds, the relay switches 98, 100 and 122 will have been actuated and the voltage available at the tap 62 of the potentiometer 56 will be that derived from the tap 76 of the potentiometer 74. Under these latter conditions, the sound track grooves cut into the record disc will be at a maximum pitch, that is, a maximum number of grooves per unit of length, as will be explained hereinafter.

Figure 3:
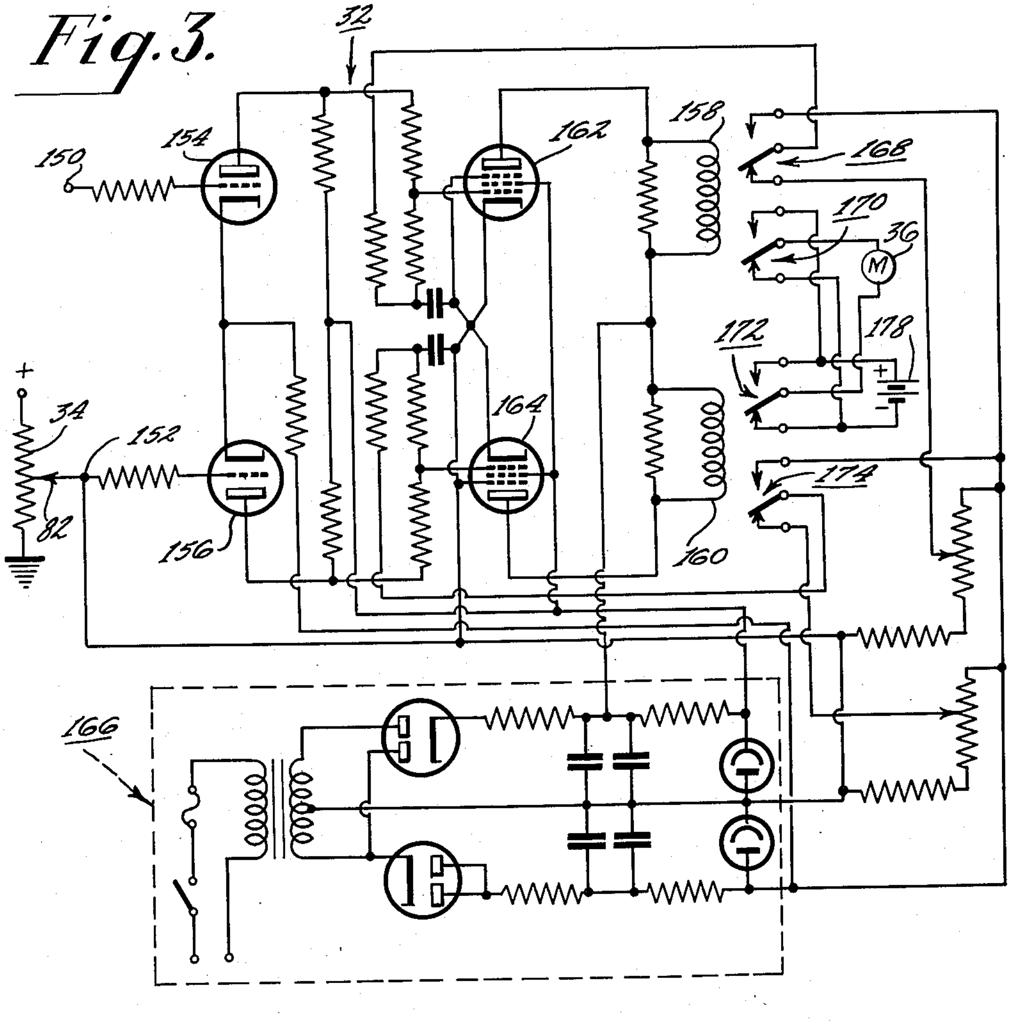
Fig. 3 is a schematic diagram of a servo system for controlling the pitch of a disc recorder.

Referring now to Fig. 3, there is shown the servo amplifier 32 for controlling the servomotor 36 in accordance with the signals to be recorded. The voltage at the tap 62 of the potentiometer 56 (Fig. 2) is connected to an input terminal 150 of the servo amplifier 32, through the resistor 64. The variable tap 82 of the potentiometer 34 is connected to an input terminal 152 of the servo amplifier 32. The servo amplifier of Fig. 3 is well known in the art, and comprises means for comparing a first signal voltage applied to the input terminal 150 with a second signal voltage applied to the input terminal 152, in a manner whereby the output of the servo amplifier 32 will be zero if the signals compared are equal. A voltage output in one direction results if the first signal voltage is greater than the other, and a voltage output in an apposite direction results if the second signal voltage is greater than the first signal voltage. Since the servo amplifier 32 of Fig. 3 is well known in the art, it will not be described in detail. It will be understood, therefore, that when the signal applied to the grid of a first amplifier 154 is equal to a signal applied to the grid of a parallel amplifier 156, similar currents will flow in solenoid relay coils 158 and 160, in the anode circuits of amplifiers 162 and 164, connected to the output of the amplifiers 154 and 156, respectively. A power supply 166 supplies the operating potentials for the servo amplifier 32. Relay switches 168 and 170 are associated with the solenoid coil 158, and relay switches 172 and 174 are associated with the solenoid coil 160. The relay switches 168, 170, 172 and 174 are single-pole double-throw switches. The reversible motor 36, whose direction of rotation depends upon the direction of the current through the motor, is connected between the armatures of the relay switches 170 and 172. A source of unidirectional voltage 178, such as a 24 volt battery, is connected between the fixed contacts of the relay switch 172. Each of the fixed contacts of the relay switch 170 are connected to each of the fixed contacts of the relay switch 172, respectively. It will now be understood that when the currents through the solenoid coils 158 and 160 are equal, as when equal signal voltages are applied to the input terminals 150 and 152 of the servo amplifier, the solenoid relay switches 168, 170, 172 and 174 will be in the same position. Under these conditions, no current will flow from the direct current voltage source 178 through the motor 176. It will also be noted that when the input signal to the terminal 150 is greater than the signal applied to the signal of the servo amplifier, the relay switches 168 and 170 will be actuated but the relay switches 172 and 174 will not. Under these conditions, current will flow through the motor 176 in one direction and the motor will rotate in a first direction. When the voltage applied to the input terminal 150 is less than that applied to the input terminal 152 of the servo amplifier 32, the relay switches 172 and 174 will be actuated and the relay switches 168 and 170 will not. Under these latter conditions, current will flow through the motor 176 in an opposite direction and the motor armature will rotate in an opposite direction.

Figure 4:
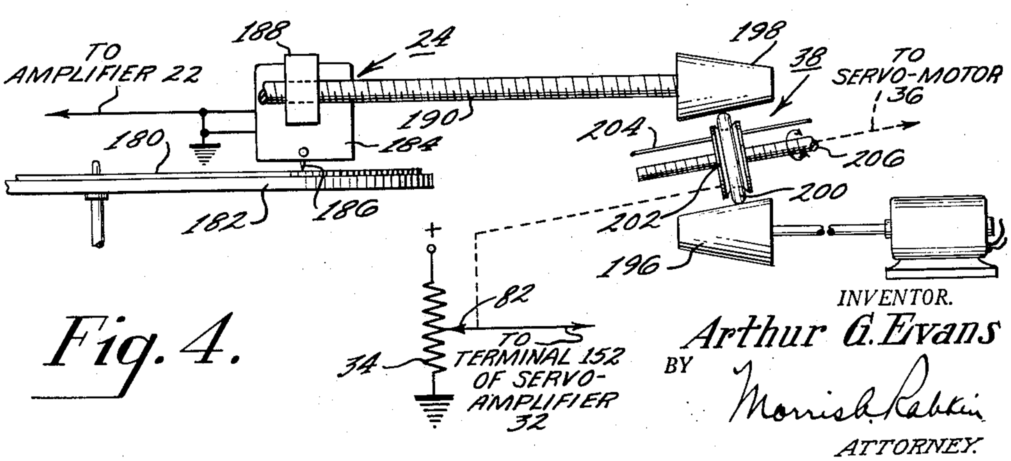
Fig. 4 is a schematic showing of a control system and associated parts of a disc recorder as used with the automatic variable pitch control apparatus, in accordance with the present invention.

Referring now to Fig. 4, there is shown a portion of the disc recording machine 24 for use with the control unit of the present invention. A recording disc 180 to be cut is placed upon a turntable 182 that is rotated at a constant speed by a motor (not shown), in a manner well known in the art. A recording head 184 is connected to the output of the amplifier 22 (Fig. 1) for the purpose of vibrating a stylus 186 in accordance with the amplitudes of signals derived therefrom. The recording head 184 is fixed to a carriage 188 in threadable engagement with a lead screw 190 for the purpose of advancing the recording head 184 across the record. The lead screw 190 is coupled to a constant speed motor 192 through a pitch control or speed change device 38, for the purpose of varying the speed of rotation of the lead screw 190, and hence controlling the advancement of the recording head 184 across the record 180. A driven cone 196 is fixed to the motor 192 for rotation about its shaft. The lead screw 190 has one end thereof fixed to a driven cone 198. An idler 200, for transmission of power between the cones 196 and 198, is rotatably mounted upon a carriage 202. The carriage 202 is prevented from rotation by a guide rod 204, and threadably engages a feed screw 206. The feed screw 206 is coupled to the servomotor 36. The movable tap 82 of the potentiometer 34 is mechanically coupled to the carriage 202, by any suitable means well known in the art, for varying the voltage that is applied to the terminal 152 of a servo amplifier 32 (Fig. 3) in accordance with the position of a carriage 202.

The operation of the recording system, during the process of cutting sound track grooves in the record 180, will now be explained to illustrate how the pitch of the sound track grooves is varied between upper and lower fixed limits by the control circuit 30 (Fig. 1), in accordance with the present invention. The operator will fix the maximum pitch desired on the record 180 by setting the tap 76 on the potentiometer 74, in Fig. 2, to a predetermined calibrated voltage, say 30 volts with respect to ground, for example. The minimum pitch is fixed by setting the tap 62 of the potentiometer 56 to a predetermined calibrated position, say 100 volts with respect to ground, when the voltage regulator tube 61 is fired. It will be noted that the voltage across the potentiometer 56 is limited to a fixed maximum value by the voltage regulator tube 61. The potentiometers 90 and 92 are adjusted so that when the signal to be recorded is at a threshold voltage, that is, a signal of relatively low amplitude, the tube 84 will be triggered on. It will be noted that the diode 88 provides a high negative voltage to the grid of the tube 84 that is negative-going with signals of increasing high amplitude. The threshold voltage may be the same as the voltage at the tap 76 of the potentiometer 74, or slightly higher. In the example being considered, the threshold voltage at which the tube 84 will be made conductive may be 31 volts, for example.

Let it be assumed that the signals from the master tape 10 are of a relatively low amplitude, so that the voltage at the tap 62 of the potentiometer 56 is determined solely by the tap 76 of the potentiometer 74. Under these circumstances, the tap 82 of the position-sensing potentiometer 34 will also be at a low voltage, and the lead screw 190 will be driven with a minimum speed. Thus, the pitch of the sound track grooves recorded on the disc 180 will be at a maximum.

Let it be assumed that the signals being recorded are such that the voltage at the tap 62 of the potentiometer 56 varies between 30 volts and 100 volts. This variation in voltage will cause the motor 36 to turn in one direction or in the other, depending upon whether the voltage at the terminal 150 of the servo amplifier is greater or less than the voltage at the tap 82 of the position-sensing potentiometer 34, as explained heretofore. It will be understood that as the amplitude of the signals increases, the carriage 202 will be moved along the feed screw 206, in a direction, to the right looking at Fig. 4, to speed up the rotation of the lead screw 190. This decreases the pitch of the sound groove tracks on the record disc 180. The reverse is true when the amplitude of the signals decreases, within the range from 100 volts to approximately 31 volts.

Let it now be assumed that the signal to be recorded drops from a relatively high amplitude to the threshold voltage of 31 volts, or less, at the tap 62 of the potentiometer 56. The grid of the tube 84 will now begin conducting because the voltage thereat has become sufficiently less negative to cause the tube 84 to conduct. Due to current flowing in the solenoid coil 86, the armature 102 of the relay 98 will now touch contact 106. The grid of the tube 84 is now biased more negative to increase its sensitivity, whereby a small negative-going signal will cut the tube 84 off. The armature 110 of the relay 100 will now touch the contact 115 and the capacitor 132 will begin to discharge through the resistor 130. The time constant of the resistance-capacitance network, comprising the capacitor 132 and the resistor 130, is chosen so that in approximately two seconds the voltage at the grid of the tube 112 will fall sufficiently to cut off conduction therethrough. Under these conditions, the armature 126 of the relay switch 122 touches the contact 124, thereby shorting the potentiometer 56 to ground. It will be understood, that, in practice, the resistance of the potentiometer 56 is about 1,000 times as high as that of the resistor 128. When this happens, the voltage applied to the terminal 150 of the servo amplifier 32 will be that derived from the tap 76 of the potentiometer 74. At this voltage, the sound track grooves will be recorded at a maximum pitch. Thus, it is seen that the threshold control circuit provides a means for accelerating the decay time of the resistance-capacitance network 59 at a faster rate than otherwise. This causes the carriage 202 to move in a direction, to the left looking at Fig. 4, to decrease the speed of the lead screw 190 quickly so that the sound track grooves will now be recorded with a maximum pitch.

Although the automatic variable pitch control apparatus of the present invention has been shown and described in conjunction with the audio signals derived from a tape recorder, it will be understood that the invention may be practiced with other sources of signals. The signal source, for example, may be from a phonograph record; and two spaced apart pick-ups may be employed, one for providing recording signals and the other for providing control signals. Where a microphone is used in a "live" pick-up, a suitable delay system may be used in the recording channel, whereby to provide a recording signal and a control signal.

What is claimed is:

1. In a recording system for recording signals on a record, a recording head, means for propelling said head over said record, means responsive to signals between a predetermined high amplitude and a predetermined low amplitude for varying the speed of propulsion of said head substantially proportionally in accordance with the amplitude of said signals, means responsive to signals greater than said high amplitude to limit these signals to a first control signal of constant amplitude for maintaining the speed of propulsion of said head at a constant maximum speed, and means responsive to signals below said predetermined low amplitude to limit these signals to a second control signal of constant amplitude for maintaining the speed of propulsion of said head at a minimum constant speed.

2. A recording system for recording a variable amplitude signal along a recording path arranged to provide spaced track portions, said system comprising a recording device, means to propel said recording device in a manner to trace said path, means for applying said signal to said recording device whereby to record said signal as said recording path is traced, drive means connected to said propelling means, a servomotor connected to said propelling means, means for deriving a control signal from said variable amplitude signal for said servomotor, means for limiting the amplitude of said control signal between upper and lower limits when said variable amplitude signal is above and below predetermined upper and lower amplitudes respectively, means to apply said control signal to said servomotor, and means to apply to said servomotor a signal proportional to the instantaneous speed of said propelling means for comparison of said control signal whereby to control the speed of propulsion of said recording device.

3. In a recording system, a recording head, a lead screw for feeding said head, means responsive to signals between a predetermined high amplitude and a predetermined low amplitude to be recorded by said head for varying the speed of rotation of said screw substantially proportionally in accordance with the amplitude of said signals, means responsive to signals greater than said predetermined high amplitude to limit them to a signal of a predetermined maximum amplitude for maintaining the speed of rotation of said screw at a constant maximum speed, and means responsive to signals below said predetermined low amplitude to limit them to a signal of predetermined minimum amplitude for maintaining the speed of rotation of said screw at a minimum constant speed of rotation.

4. In a recording system for audio signals, a recording head, a lead screw for feeding said head, means including a resistance-capacitance network for obtaining the envelope of said audio signals, means responsive to signals between a predetermined high amplitude and a predetermined low amplitude to be recorded by said head for varying the speed of rotation of said screw in accordance with said envelope of said signals, means responsive to signals greater than said high amplitude for maintaining the speed of rotation of said screw at a constant maximum speed, means responsive to signals below said predetermined low amplitude for maintaining the speed of rotation of said screw at a minimum constant speed of rotation, and means for shorting said resistance-capacitance network in response to signals below a predetermined amplitude for a predetermined time.

5. In a recording system, a recording head, a lead screw for feeding said head, means responsive to signals between a predetermined high amplitude and a predetermined low amplitude to be recorded by said head for varying the speed of rotation of said screw in accordance with the amplitude of said signals, means responsive to signals greater than said high amplitude for maintaining the speed of rotation of said screw at a constant maximum speed, means responsive to signals below said predetermined low amplitude for maintaining the speed of rotation of said screw at a minimum constant speed of rotation, and means including a resistance-capacitance network responsive to a signal between said predetermined high and predetermined low amplitudes for decelerating, at a rate faster than the time constant of said resistance-capacitance network, the speed of rotation of said screw to said minimum constant speed in the absence of a signal of higher amplitude within a predetermined time.

6. In a recording system for audio signals, a recording head, a lead screw for continuously feeding said head, a motor, a speed-changing device coupled between said motor and said lead screw, means for rectifying said audio signals, means in circuit with said rectifying means for limiting the amplitude of said rectified signals to a predetermined maximum amplitude, a resistance-capacitance network having a relatively long time constant, means connecting said resistance-capacitance network across said voltage limiting means, means including said resistance-capacitance network for changing the setting of said speed-changing device in response to the envelope of said rectified audio signals, means to limit the minimum speed of said screw in response to said rectified signals of a predetermined low amplitude, and means for reducing the natural decay time of said resistance-capacitance network in response to a rectified audio signal smaller than a predetermined amplitude and over a predetermined period of time.

7. In a recording system, a recording head, a lead screw for feeding said head axially along said screw, means for fixing the maximum speed of rotation of said screw in response to signals greater than a first predetermined amplitude to be recorded by said head, means connected to said first mentioned means for fixing the minimum speed of rotation of said screw in response to signals smaller than a second predetermined amplitude to be recorded by said head, means responsive to signals of intermediate amplitudes between said first and said second predetermined amplitudes to be recorded by said head for varying the speed of rotation of said screw proportionally to the envelope of said signals of intermediate amplitudes, said last-mentioned means comprising a resistance-capacitive network having a relatively long time constant for deriving said envelope of said intermediate signals, and means responsive to signals smaller than a predetermined one of said intermediate signals for accelerating the decay time of said resistance-capacitive network, whereby to reduce the speed of said screw quickly.

8. In a recording system for audio signals, a recording head, a lead screw for feeding said head axially along said screw, means for rectifying said audio signals, means connected across said rectifying means for limiting said rectified signals to a predetermined maximum amplitude, a resistance-capacitance network connected across said amplitude limiting means, a source of unidirectional voltage, a diode having an anode and a cathode, means connecting said anode to said source of unidirectional voltage, means connecting said cathode to said resistance-capacitance network, a position-sensing potentiometer connected across said source of voltage, a servo amplifier having a first and second input and an output, a servomotor connected to the output of said amplifier and adapted to rotate in either of two positions dependent upon the difference between the amplitudes of signals applied to said inputs, means to connect the cathode of said diode to one of said inputs, means to connect said position-sensing potentiometer to the other of said inputs, and means to couple said motor to said lead screw to vary the speed of rotation thereof in accordance with the direction of rotation of said motor.

9. In a signal recording system, a recording head, means for moving said head, electrical means having a predetermined time constant for obtaining the envelope of signals to be recorded, means responsive to signals between a predetermined high amplitude and a predetermined low amplitude to be recorded by said head for varying the speed of movement of said head in accordance with said envelope of said signals, means responsive to signals greater than said high amplitude for maintaining the speed of movement of said head at a constant maximum speed, means responsive to signals below said predetermined low amplitude for maintaining the speed of movement of said head at a minimum constant speed, and means for short circuiting said electrical envelope obtaining means in response to signals below a predetermined amplitude for a predetermined time, whereby to decrease the time constant of said electrical envelope obtaining means.

References Cited in the file of this patent

UNITED STATES PATENTS 2,611,038 Graham ............... Sept. 16, 1952